(12) United States Patent  
Xia et al.

(10) Patent No.: US 9,298,720 B2
(45) Date of Patent: Mar. 29, 2016

(54) SYSTEMS AND METHODS FOR FRAGMENTED DATA RECOVERY

(71) Applicant: LSI Corporation, San Jose, CA (US)

(72) Inventors: Haitao Xia, San Jose, CA (US); Lu Lu, San Jose, CA (US); Shu Li, San Jose, CA (US); Xuebin Wu, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 81 days.

(21) Appl. No.: 14/047,441

(22) Filed: Oct. 7, 2013

(65) Prior Publication Data

US 2015/0082115 A1    Mar. 19, 2015

Related U.S. Application Data

(60) Provisional application No. 61/878,678, filed on Sep. 17, 2013, provisional application No. 61/885,314, filed on Oct. 1, 2013.

(51) Int. Cl.
*H03M 13/00* (2006.01)
*G06F 17/30* (2006.01)
*G06F 11/08* (2006.01)

(52) U.S. Cl.
CPC ........ *G06F 17/30135* (2013.01); *G06F 11/085* (2013.01)

(58) Field of Classification Search
None
See application file for complete search history.

(56) References Cited

U.S. PATENT DOCUMENTS

| | | |
|---|---|---|
| 4,553,221 A | 11/1985 | Hyatt |
| 4,805,174 A | 2/1989 | Kubot |
| 5,278,703 A | 1/1994 | Rub et al. |
| 5,278,846 A | 1/1994 | Okayama |
| 5,317,472 A | 5/1994 | Schweitzer, III |
| 5,325,402 A | 6/1994 | Ushirokawa |
| 5,351,274 A | 9/1994 | Chennakeshu |
| 5,392,299 A | 2/1995 | Rhines |
| 5,406,593 A | 4/1995 | Chennakeshu |
| 5,417,500 A | 5/1995 | Martinie |
| 5,450,253 A | 9/1995 | Seki |
| 5,513,192 A | 4/1996 | Janku |
| 5,523,903 A | 6/1996 | Hetzler |

(Continued)

FOREIGN PATENT DOCUMENTS

| | | | |
|---|---|---|---|
| JP | 2001/319433 A | | 11/2001 |
| WO | WO 2010/059264 A1 | | 5/2010 |
| WO | WO 2010/126482 A1 | | 11/2010 |

OTHER PUBLICATIONS

U.S. Appl. No. 13/426,714, filed Mar. 22, 2012, Shaohua Yang.

(Continued)

*Primary Examiner* — Daniel McMahon

(57) ABSTRACT

Systems and method relating generally to data processing, and more particularly to systems and methods for fragmenting a data set and recovering the fragmented data set. As one example, a data processing system is discussed that includes: a fragmenting circuit operable to separate a data set into at least a first fragment and a second fragment; and a transfer packet formation circuit operable to: append identification information to the front of the first fragment, and at least a first M+N bits of the second fragment to the end of the first fragment to yield a first transfer fragment, and aggregate the first transfer fragment with other transfer fragments to yield an aggregate output.

17 Claims, 6 Drawing Sheets

(56) References Cited

U.S. PATENT DOCUMENTS

| | | |
|---|---|---|
| 5,550,810 A | 8/1996 | Monogioudis et al. |
| 5,550,870 A | 8/1996 | Blaker |
| 5,612,964 A | 3/1997 | Haraszti |
| 5,696,504 A | 12/1997 | Oliveros |
| 5,710,784 A | 1/1998 | Kindred |
| 5,717,706 A | 2/1998 | Ikeda |
| 5,719,871 A | 2/1998 | Helm |
| 5,802,118 A | 9/1998 | Bliss |
| 5,818,806 A * | 10/1998 | Wong et al. .......... G11B 7/0052 360/53 |
| 5,844,945 A | 12/1998 | Nam |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | Mccalissister |
| 6,023,783 A | 2/2000 | Divsalar |
| 6,029,264 A | 2/2000 | Kobayashi |
| 6,065,149 A | 5/2000 | Yamanaka |
| 6,097,764 A | 8/2000 | McCallister |
| 6,145,110 A | 11/2000 | Khayrallah |
| 6,175,588 B1 | 1/2001 | Visotsky |
| 6,216,249 B1 | 4/2001 | Bliss |
| 6,216,251 B1 | 4/2001 | McGinn |
| 6,266,795 B1 | 7/2001 | Wei |
| 6,317,472 B1 | 11/2001 | Choi |
| 6,351,832 B1 | 2/2002 | Wei |
| 6,377,610 B1 | 4/2002 | Hagenauer |
| 6,381,726 B1 | 4/2002 | Weng |
| 6,393,074 B1 | 5/2002 | Mandyam |
| 6,412,088 B1 | 6/2002 | Patapoutian et al. |
| 6,473,878 B1 | 10/2002 | Wei |
| 6,532,128 B1 * | 3/2003 | Bui et al. .................. 360/74.1 |
| 6,535,553 B1 | 3/2003 | Limberg et al. |
| 6,625,775 B1 | 9/2003 | Kim |
| 6,643,814 B1 | 11/2003 | Cideciyan et al. |
| 6,690,524 B1 * | 2/2004 | Wakefield et al. ....... G11B 19/04 360/51 |
| 6,697,441 B1 | 2/2004 | Bottomley |
| 6,747,827 B1 | 6/2004 | Bassett et al. |
| 6,748,034 B2 | 6/2004 | Hattori |
| 6,757,862 B1 | 6/2004 | Marianetti, II |
| 6,785,863 B2 | 8/2004 | Blankenship |
| 6,807,238 B1 | 10/2004 | Rhee |
| 6,810,502 B2 | 10/2004 | Eidson |
| 6,839,774 B1 | 1/2005 | Ahn et al. |
| 6,948,113 B1 | 9/2005 | Shaver |
| 6,970,511 B1 | 11/2005 | Barnette |
| 6,975,692 B2 | 12/2005 | Razzell |
| 6,986,098 B2 | 1/2006 | Poeppelman |
| 7,035,327 B2 | 4/2006 | Nakajima et al. |
| 7,047,474 B2 | 5/2006 | Rhee |
| 7,058,853 B1 | 6/2006 | Kavanappillil et al. |
| 7,058,873 B2 | 6/2006 | Song |
| 7,073,118 B2 | 7/2006 | Greenberg |
| 7,093,179 B2 | 8/2006 | Shea |
| 7,117,427 B2 | 10/2006 | Ophir |
| 7,133,228 B2 | 11/2006 | Fung |
| 7,136,244 B1 | 11/2006 | Rothberg |
| 7,184,486 B1 | 2/2007 | Wu |
| 7,191,378 B2 | 3/2007 | Eroz |
| 7,203,887 B2 | 4/2007 | Eroz |
| 7,230,550 B1 | 6/2007 | Mittal |
| 7,237,181 B2 | 6/2007 | Richardson |
| 7,272,687 B2 * | 9/2007 | Balasubramanian ......... 711/114 |
| 7,308,061 B1 | 12/2007 | Huang |
| 7,310,768 B2 | 12/2007 | Eidson |
| 7,313,750 B1 | 12/2007 | Feng |
| 7,370,258 B2 | 5/2008 | Iancu |
| 7,415,651 B2 | 8/2008 | Argon |
| 7,502,189 B2 | 3/2009 | Sawaguchi |
| 7,523,375 B2 | 4/2009 | Spencer |
| 7,587,657 B2 | 9/2009 | Haratsch |
| 7,590,168 B2 | 9/2009 | Raghavan |
| 7,596,196 B1 | 9/2009 | Liu et al. |
| 7,646,829 B2 | 1/2010 | Ashley |
| 7,702,986 B2 | 4/2010 | Bjerke |
| 7,738,202 B1 | 6/2010 | Zheng |
| 7,752,523 B1 | 7/2010 | Chaichanavong |
| 7,779,325 B2 | 8/2010 | Song |
| 7,802,172 B2 | 9/2010 | Vila Casado et al. |
| 7,952,824 B2 | 5/2011 | Dziak |
| 7,957,251 B2 | 6/2011 | Ratnakar |
| 7,958,425 B2 | 6/2011 | Chugg |
| 7,996,746 B2 | 8/2011 | Livshitz |
| 8,018,360 B2 | 9/2011 | Nayak |
| 8,020,069 B1 | 9/2011 | Feng |
| 8,020,078 B2 | 9/2011 | Richarson |
| 8,161,361 B1 | 4/2012 | Song et al. |
| 8,201,051 B2 | 6/2012 | Tan |
| 8,225,168 B2 | 7/2012 | Yu et al. |
| 8,237,597 B2 | 8/2012 | Liu |
| 8,255,765 B1 | 8/2012 | Yeo |
| 8,261,171 B2 | 9/2012 | Annampedu |
| 8,291,284 B2 | 10/2012 | Savin |
| 8,291,299 B2 | 10/2012 | li |
| 8,295,001 B2 | 10/2012 | Liu |
| 8,296,637 B1 | 10/2012 | Varnica |
| 8,370,711 B2 | 2/2013 | Alrod |
| 8,381,069 B1 | 2/2013 | Liu |
| 8,413,032 B1 | 4/2013 | Song |
| 8,429,498 B1 | 4/2013 | Anholt |
| 8,443,267 B2 | 5/2013 | Zhong et al. |
| 8,458,555 B2 | 6/2013 | Gunnam |
| 8,464,142 B2 | 6/2013 | Gunnam |
| 8,495,462 B1 | 7/2013 | Liu |
| 8,516,339 B1 | 8/2013 | Lesea |
| 8,527,849 B2 | 9/2013 | Jakab |
| 8,699,164 B1 * | 4/2014 | Ying et al. ................... 360/51 |
| 2001/0010089 A1 | 7/2001 | Gueguen |
| 2001/0016114 A1 | 8/2001 | Van Gestel et al. |
| 2002/0021519 A1 | 2/2002 | Rae |
| 2002/0067780 A1 | 6/2002 | Razzell |
| 2002/0129192 A1 * | 9/2002 | Spiegel et al. ................ 711/103 |
| 2002/0168033 A1 | 11/2002 | Suzuki |
| 2003/0031236 A1 | 2/2003 | Dahlman |
| 2003/0123364 A1 | 7/2003 | Nakajima et al. |
| 2003/0126527 A1 | 7/2003 | Kim et al. |
| 2003/0138102 A1 | 7/2003 | Kohn et al. |
| 2003/0147168 A1 | 8/2003 | Galbraith et al. |
| 2003/0161422 A1 * | 8/2003 | Bi ........................ H04B 1/7103 375/348 |
| 2003/0188252 A1 | 10/2003 | Kim |
| 2004/0042436 A1 | 3/2004 | Terry et al. |
| 2004/0194007 A1 | 9/2004 | Hocevar |
| 2004/0228021 A1 | 11/2004 | Yamazaki |
| 2004/0255024 A1 * | 12/2004 | Jones et al. ................... 709/224 |
| 2004/0264284 A1 | 12/2004 | Priborsky et al. |
| 2005/0047514 A1 | 3/2005 | Bolinth |
| 2005/0149842 A1 | 7/2005 | Kyung |
| 2005/0210367 A1 | 9/2005 | Ashikhmin |
| 2005/0243456 A1 | 11/2005 | Mitchell et al. |
| 2006/0002689 A1 | 1/2006 | Yang et al. |
| 2006/0159355 A1 | 7/2006 | Mizuno |
| 2006/0195730 A1 | 8/2006 | Kageyama |
| 2007/0185902 A1 | 8/2007 | Messinger et al. |
| 2007/0234178 A1 | 10/2007 | Richardson |
| 2007/0297496 A1 | 12/2007 | Park et al. |
| 2008/0037676 A1 | 2/2008 | Kyun et al. |
| 2008/0069148 A1 * | 3/2008 | Wu ................................. 370/498 |
| 2008/0069373 A1 | 3/2008 | Jiang |
| 2008/0140686 A1 | 6/2008 | Hong |
| 2008/0304558 A1 | 12/2008 | Zhu et al. |
| 2009/0003301 A1 | 1/2009 | Reial |
| 2009/0092174 A1 | 4/2009 | Wang |
| 2009/0106633 A1 | 4/2009 | Fujiwara |
| 2009/0125780 A1 | 5/2009 | Taylor |
| 2009/0132893 A1 | 5/2009 | Miyazaki |
| 2009/0150745 A1 | 6/2009 | Langner et al. |
| 2009/0177852 A1 | 7/2009 | Chen |
| 2009/0185643 A1 | 7/2009 | Fitzpatrick |
| 2009/0216942 A1 | 8/2009 | Yen |
| 2009/0273492 A1 | 11/2009 | Yang et al. |
| 2010/0077276 A1 | 3/2010 | Okamura et al. |

(56) References Cited

U.S. PATENT DOCUMENTS

| | | | |
|---|---|---|---|
| 2010/0088575 A1 | 4/2010 | Sharon et al. | |
| 2010/0150252 A1 | 6/2010 | Camp | |
| 2010/0172046 A1 | 7/2010 | Liu et al. | |
| 2010/0241921 A1 | 9/2010 | Gunnam | |
| 2010/0268996 A1 | 10/2010 | Yang | |
| 2010/0322048 A1 | 12/2010 | Yang et al. | |
| 2010/0325511 A1 | 12/2010 | Oh | |
| 2011/0041040 A1 | 2/2011 | Su | |
| 2011/0043938 A1 | 2/2011 | Mathew | |
| 2011/0066768 A1 | 3/2011 | Brittner et al. | |
| 2011/0167227 A1 | 7/2011 | Yang | |
| 2011/0258508 A1 | 10/2011 | Ivkovic | |
| 2011/0264987 A1 | 10/2011 | Li | |
| 2011/0307760 A1 | 12/2011 | Pisek | |
| 2011/0320902 A1 | 12/2011 | Gunnam | |
| 2012/0020402 A1 | 1/2012 | Ibing | |
| 2012/0038998 A1 | 2/2012 | Mathew | |
| 2012/0060072 A1* | 3/2012 | Simitci et al. | 714/756 |
| 2012/0063023 A1 | 3/2012 | Mathew | |
| 2012/0079353 A1 | 3/2012 | Liikanen | |
| 2012/0106413 A1* | 5/2012 | Huang et al. | 370/310 |
| 2012/0124118 A1 | 5/2012 | Ivkovic | |
| 2012/0182643 A1 | 7/2012 | Zhang | |
| 2012/0185744 A1 | 7/2012 | Varnica | |
| 2012/0203986 A1 | 8/2012 | Strasser et al. | |
| 2012/0207201 A1 | 8/2012 | Xia | |
| 2012/0212849 A1 | 8/2012 | Xu | |
| 2012/0236428 A1 | 9/2012 | Xia | |
| 2012/0262814 A1 | 10/2012 | Li | |
| 2012/0265488 A1 | 10/2012 | Sun | |
| 2012/0317462 A1 | 12/2012 | Liu et al. | |
| 2013/0016724 A1* | 1/2013 | Thaler | 370/393 |
| 2013/0024740 A1 | 1/2013 | Xia | |
| 2013/0031440 A1 | 1/2013 | Sharon | |
| 2013/0120169 A1 | 5/2013 | Li | |
| 2013/0194955 A1 | 8/2013 | Chang | |
| 2013/0198580 A1 | 8/2013 | Chen | |
| 2013/0238955 A1 | 9/2013 | D'Abreu | |
| 2013/0254616 A1 | 9/2013 | Yang | |
| 2013/0254619 A1 | 9/2013 | Zhang | |
| 2014/0281818 A1* | 9/2014 | Dziak et al. | 714/770 |

OTHER PUBLICATIONS

Casado et al., Multiple-rate low-density parity-check codes with constant blocklength, IEEE Transations on communications, Jan. 2009, vol. 57, pp. 75-83.

Cui et al., "High-Throughput Layered LDPC Decoding Architecture", IEEE Transactions on Very Large Scale Integration (VLSI) Systems, vol. 17, No. 4 (Apr. 2009).

Fan et al., "Constrained coding techniques for soft iterative decoders" Proc. IEEE Global Telecommun. Conf., vol. 1b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. 1 Jan. 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Patapoutian et al "Improving Re-Read Strategies by Waveform Averaging" IEEE Transactions on Mag. vol. 37 No. 6, Nov. 2001.

Richardson, T "Error Floors of LDPC Codes" Flarion Technologies Bedminster NJ 07921, tjr@flarion.com (not dated).

Shokrollahi "LDPC Codes: An Introduction", Digital Fountain, Inc. (Apr. 2, 2003).

Spagnol et al, "Hardware Implementation of GF(2m) LDPC Decoders", IEEE Transactions on Circuits and Systemsši: Regular Papers, vol. 56, No. 12 (Dec. 2009).

Tehrani et al., "Fully Parallel Stochastic LDPC Decoders", IEEE Transactions on Signal Processing, vol. 56, No. 11 (Nov. 2008).

Todd et al., "Enforcing maximum-transition-run code constraints and low-density parity check decoding", IEEE Trans. Magn., vol. 40, No. 6, pp. 3566-3571 (Nov. 2004).

U.S. Appl. No. 13/302,119, filed Nov. 22, 2011, Lei Chen, Unpublished.

U.S. Appl. No. 13/239,683, filed Sep. 22, 2011, Changyou Xu, Unpublished.

U.S. Appl. No. 13/186,234, filed Jul. 19, 2011, Haitao Xia, Unpublished.

U.S. Appl. No. 13/213,751, filed Aug. 19, 2011, Fan Zhang, Unpublished.

U.S. Appl. No. 14/025,104, filed Sep. 12, 2013, Bruce Wilson, Unpublished.

U.S. Appl. No. 13/327,279, filed Dec. 15, 2011, Wei Feng, Unpublished.

U.S. Appl. No. 13/445,848, filed Apr. 12, 2012, Bruce Wilson, Unpublished.

U.S. Appl. No. 13/340,951, filed Dec. 30, 2011, Lei Chen, Unpublished.

U.S. Appl. No. 13/369,468, filed Feb. 9, 2012, Zongwang Li, Unpublished.

U.S. Appl. No. 13/283,549, filed Oct. 27, 2011, Wu Chang, Unpublished.

U.S. Appl. No. 13/171,615, filed Jun. 29, 2011, Bradley D. Seago, Unpublished.

U.S. Appl. No. 13/300,078, filed Nov. 18, 2011, Chung-Li Wang, Unpublished.

U.S. Appl. No. 13/305,510, filed Nov. 28, 2011, Lei Chen, Unpublished.

U.S. Appl. No. 13/227,416, filed Sep. 7, 2011, Lei Chen, Unpublished.

U.S. Appl. No. 13/305,551, filed Nov. 28, 2011, Yang Han, Unpublished.

U.S. Appl. No. 13/296,022, filed Nov. 14, 2011, Victor Krachkovsky, Unpublished.

U.S. Appl. No. 13/445,878, filed Apr. 12, 2012, Yu Liao, Unpublished.

U.S. Appl. No. 13/174,537, filed Jun. 30, 2011, Anantha Raman Krishnan, Unpublished.

U.S. Appl. No. 13/174,453, filed Jun. 30, 2011, Johnson Yen, Unpublished.

U.S. Appl. No. 13/227,544, filed Sep. 8, 2011, Shaohua Yang, Unpublished.

U.S. Appl. No. 13/545,833, filed Jul. 10, 2012, Zhi Bin Li, Unpublished.

(56) References Cited

OTHER PUBLICATIONS

U.S. Appl. No. 13/180,495, filed Jul. 11, 2011, Chung-Li Wang, Unpublished.
U.S. Appl. No. 13/945,777, filed Jul. 18, 2013, Shu Li, Unpublished.
U.S. Appl. No. 13/705,407, filed Dec. 5, 2012, Lingyan Sun, Unpublished.
U.S. Appl. No. 13/483,100, filed May 30, 2012, Fan Zhang, Unpublished.
U.S. Appl. No. 13/269,832, filed Oct. 10, 2011, Haitao Xia, Unpublished.
U.S. Appl. No. 13/426,693, filed Mar. 22, 2012, Shaohua Yang, Unpublished.
U.S. Appl. No. 13/340,974, filed Dec. 30, 2011, Dan Liu, Unpublished.
U.S. Appl. No. 13/652,012, filed Oct. 15, 2012, Fan Zhang, Unpublished.
U.S. Appl. No. 13/746,301, filed Jan. 21, 2013, Shu Li, Unpublished.
U.S. Appl. No. 13/766,911, filed Feb. 14, 2013, Shaohua Yang, Unpublished.
U.S. Appl. No. 13/766,891, filed Feb. 14, 2013, Shu Li, Unpublished.
U.S. Appl. No. 13/415,326, filed Mar. 8, 2012, Shaohua Yang, Unpublished.
U.S. Appl. No. 13/945,787, filed Jul. 18, 2013, Shu Li, Unpublished.
U.S. Appl. No. 13/483,105, filed May 30, 2012, Xuebin Wu, Unpublished.
U.S. Appl. No. 13/944,966, filed Jul. 18, 2013, Fan Zhang, Unpublished.
U.S. Appl. No. 13/868,779, filed Apr. 23, 2013, Fan Zhang, Unpublished.
U.S. Appl. No. 13/853,711, filed Mar. 29, 2013, Shu Li, Unpublished.
U.S. Appl. No. 13/918,510, filed Jun. 14, 2013, Shu Li, Unpublished.
U.S. Appl. No. 13/770,008, filed Feb. 19, 2013, Shaohua Yang, Unpublished.
U.S. Appl. No. 13/912,059, filed Jun. 6, 2013, Fan Zhang, Unpublished.
U.S. Appl. No. 13/954,573, filed Jul. 30, 2013, Kaitlyn T. Nguyen, Unpublished.
U.S. Appl. No. 14/026,722, filed Sep. 13, 2013, Shaohua Yang, Unpublished.
U.S. Appl. No. 13/875,357, filed May 2, 2013, Shaohua Yang, Unpublished.
U.S. Appl. No. 13/295,150, filed Nov. 14, 2011, Zongwang Li, Unpublished.
U.S. Appl. No. 13/422,986, filed Mar. 16, 2012, Fan Zhang, Unpublished.
U.S. Appl. No. 13/474,660, filed May 17, 2012, Zongwang Li, Unpublished.
U.S. Appl. No. 13/433,693, filed Mar. 29, 2012, Fan Zhang, Unpublished.
U.S. Appl. No. 13/596,819, filed Aug. 28, 2012, Shaohua Yang, Unpublished.
U.S. Appl. No. 13/426,714, filed Mar. 22, 2012, Shaohua Yang, Unpublished.
U.S. Appl. No. 13/412,520, filed Mar. 5, 2012, Fan Zhang, Unpublished.
U.S. Appl. No. 13/415,430, filed Mar. 8, 2012, Nayak Ratnakar Aravind, Unpublished.
U.S. Appl. No. 13/362,409, filed Jan. 31, 2012, Fan Zhang, Unpublished.
U.S. Appl. No. 13/372,580, filed Feb. 14, 2012, Fan Zhang, Unpublished.
U.S. Appl. No. 13/284,730, filed Oct. 28, 2011, Fan Zhang, Unpublished.
U.S. Appl. No. 13/316,741, filed Dec. 12, 2011, Yang Han, Unpublished.
U.S. Appl. No. 13/596,947, filed Aug. 28, 2012, Fan Zhang, Unpublished.
U.S. Appl. No. 13/596,978, filed Aug. 28, 2012, Fan Zhang, Unpublished.
U.S. Appl. No. 13/597,001, filed Aug. 28, 2012, Fan Zhang, Unpublished.
U.S. Appl. No. 13/619,907, filed Sep. 14, 2012, Fan Zhang, Unpublished.
U.S. Appl. No. 13/621,341, filed Sep. 17, 2012, Shaohua Yang, Unpublished.
U.S. Appl. No. 13/989,583, filed Oct. 15, 2012, Shaohua Yang, Unpublished.
U.S. Appl. No. 13/269,852, filed Oct. 10, 2011, Haitao Xia, Unpublished.
U.S. Appl. No. 13/113,219, filed May 23, 2011, Yang Han, Unpublished.
U.S. Appl. No. 13/284,767, filed Oct. 28, 2011, Fan Zhang, Unpublished.
U.S. Appl. No. 13/316,858, filed Dec. 12, 2011, Zongwang Li, Unpublished.
Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xiao, et al "Nested Codes With Multiple Interpretations" retrieved from the Internet URL: http://www.ece.nmsu.edu/~jkliewer/paper/XFKC_CISS06 (retrieved on Dec. 5, 2012).
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 7.
Zhong, "Block-LDPC: A Practical LDPC Coding System Design Approach", IEEE Trans. on Circuits, Regular Papers, vol. 5, No. 4, pp. 766-775, Apr. 2005.

\* cited by examiner

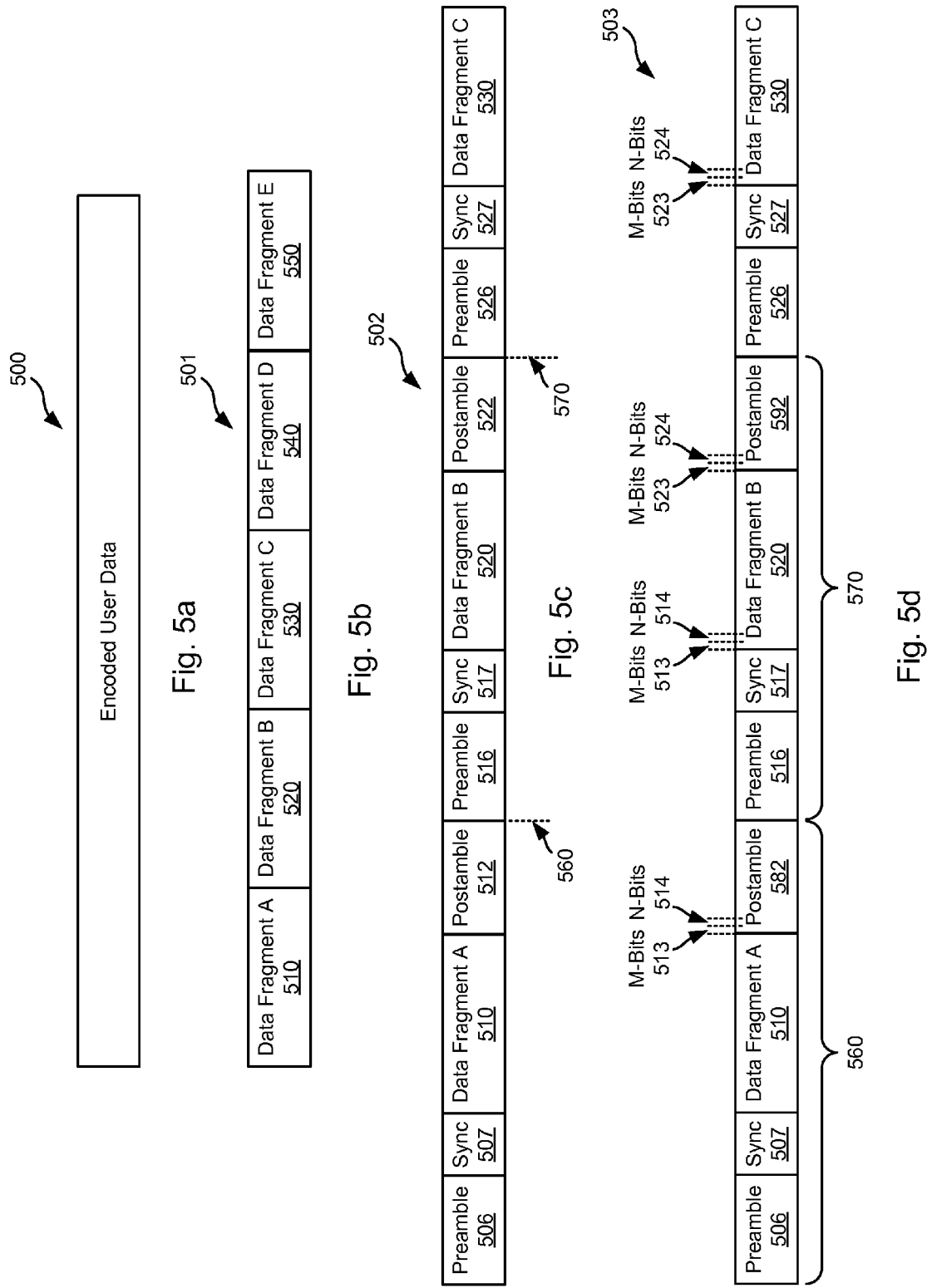

SYSTEMS AND METHODS FOR FRAGMENTED DATA RECOVERY

CROSS REFERENCE TO RELATED APPLICATIONS

The present application claims priority to (is a non-provisional of) U.S. Pat. App. No. 61/878,678 entitled "Systems and Methods for Recovered Data Stitching", and filed Sep. 17, 2013 by Yang et al., and from U.S. Pat. App. No. 61/885,314 entitled "Systems and Methods for Fragmented Data Recovery", and filed Oct. 1, 2013 by Xia et al. The entirety of the aforementioned provisional patent applications is incorporated herein by reference for all purposes.

FIELD OF THE INVENTION

Systems and method relating generally to data processing, and more particularly to systems and methods for fragmenting a data set and recovering the fragmented data set.

BACKGROUND

Data transfer devices often packetize data prior to sending the data across a transfer medium. This transfer medium may be, for example, a data transmission medium or a storage medium. Once the packetized data is received, it is reassembled to yield the original data. In some cases, errors are introduced through the reassembly process.

Hence, for at least the aforementioned reasons, there exists a need in the art for advanced systems and methods for data processing.

SUMMARY

Systems and method relating generally to data processing, and more particularly to systems and methods for fragmenting a data set and recovering the fragmented data set.

Some embodiments of the present invention provide data processing systems that include: a fragmenting circuit, a transfer packer formation circuit, and a data transfer circuit. The fragmenting circuit is operable to separate a data set into at least a first fragment and a second fragment. The transfer packet formation circuit operable to: append identification information to the front of the first fragment, and at least the first M+N bits of the second fragment to the end of the first fragment to yield a first transfer fragment; and aggregate the first transfer fragment with other transfer fragments to yield an aggregate output. The data transfer circuit operable to transfer the aggregate output via a transfer medium.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 5a-5e graphically depict data processing in accordance with some embodiments of the present invention;

DETAILED DESCRIPTION OF SOME EMBODIMENTS

Figure 1:
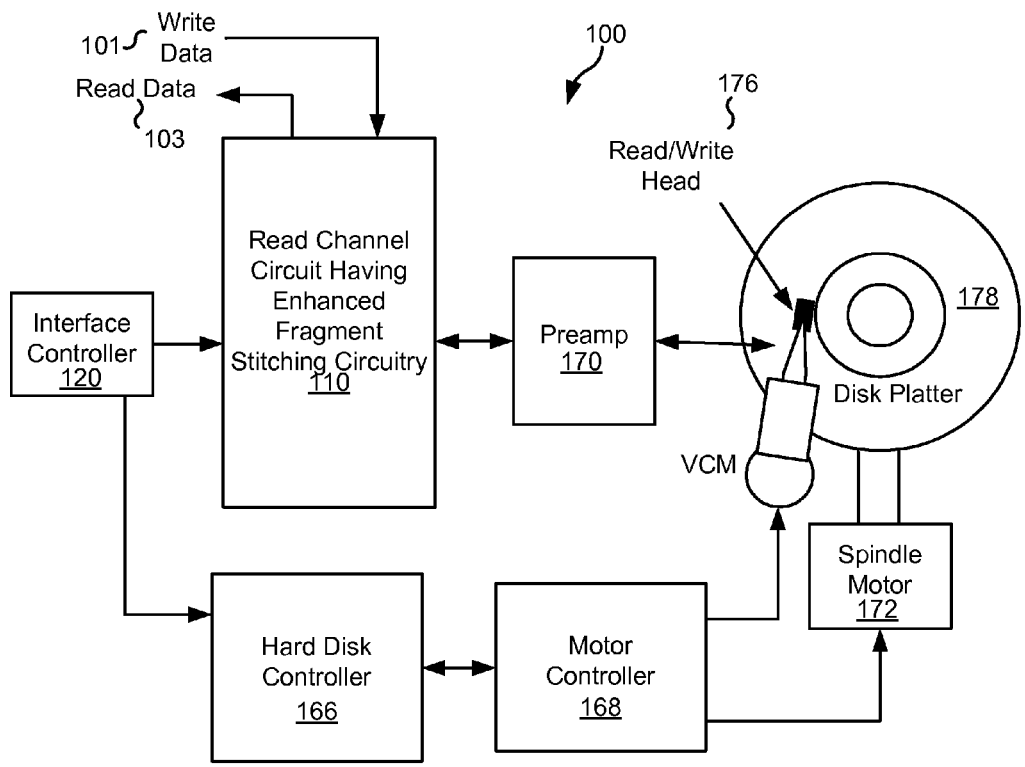
FIG. 1 shows a storage device including a read channel circuit having enhanced fragment stitching circuitry in accordance with various embodiments of the present invention.

Systems and method relating generally to data processing, and more particularly to systems and methods for fragmenting a data set and recovering the fragmented data set.

Some embodiments of the present invention provide hard disk drives that include: a disk platter, a data write circuit, a head assembly, and a data reading circuit. The data write circuit includes a fragmenting circuit, a transfer packet formation circuit, and a data transfer circuit. The fragmenting circuit is operable to separate a data set into at least a first fragment and a second fragment. The transfer packet formation circuit is operable to: append identification information to the front of the first fragment, and at least the first M+N bits of the second fragment to the end of the first fragment to yield a first transfer fragment; aggregate the first transfer fragment with other transfer fragments to yield an aggregate output. The data transfer circuit is operable to store the aggregate output to the disk platter as a stored information. The head assembly is disposed in relation to the disk platter and operable to sense the stored information on the disk platter, and to provide a signal corresponding to the sensed information. A data reading circuit includes: an analog to digital converter circuit operable to convert the sensed information to a series of digital samples; an equalizer circuit operable to equalize the digital samples to yield an equalized output, wherein the equalized output includes a first fragment of data and a second fragment of data; a stitching circuit, and a data recovery circuit. The stitching circuit is operable to: receive the stored information including at least a first fragment and a second fragment, where the first M-bits of the second fragment are received both as the first M-bits after the end of the first fragment and as the first M-bits of the second fragment; generating a modified second fragment based on the second fragment from the data set, wherein the first M-bits of the second fragment are derived from the first M-bits after the end of the first fragment; and aggregate the modified second fragment with other modified fragments to yield a codeword. The data recovery circuit is operable to process the codeword to yield an original data set. In some instances of the aforementioned embodiments, the data recovery circuit includes: a data detector circuit operable to apply a data detection algorithm to the codeword to yield a detected output; and a data decoder circuit operable to apply a data decoding algorithm to a decoder input to yield a decoded output, wherein the decoder input is derived from the detected output.

Other embodiments of the present invention provide data processing systems that include: a fragmenting circuit, a transfer packer formation circuit, and a data transfer circuit. The fragmenting circuit is operable to separate a data set into at least a first fragment and a second fragment. The transfer packet formation circuit operable to: append identification information to the front of the first fragment, and at least the first M+N bits of the second fragment to the end of the first fragment to yield a first transfer fragment; and aggregate the first transfer fragment with other transfer fragments to yield an aggregate output. The data transfer circuit operable to transfer the aggregate output via a transfer medium.

In some instances of the aforementioned embodiments, at least one of the value of M and the value of N is programmable. In various instances of the aforementioned embodiments, the identification information includes a preamble pattern and synchronization data. In one or more instances of the aforementioned embodiments, the data processing system is implemented as part of a storage device, and the medium is a storage medium. In other instances of the aforementioned embodiments, the data processing system is implemented as part of a communication device, and the medium is a communication medium. In particular cases, the communication medium is a wireless communication medium. In yet other instances of the aforementioned embodiments, the data processing system is implemented as part of an integrated circuit. Yet other instances of the aforementioned embodiments include a data encoding circuit operable to apply a data encoding algorithm to an input to yield the data set. In some cases, the data encoding algorithm is a low density parity check algorithm.

Yet other embodiments of the present invention provide data processing systems that include: a stitching circuit, and a data recovery circuit. The stitching circuit operable to: receive a data set including at least a first fragment and a second fragment, where the first M-bits of the second fragment are received both as the first M-bits after the end of the first fragment and as the first M-bits of the second fragment; generate a modified second fragment based on the second fragment from the data set, where the first M-bits of the second fragment are derived from the first M-bits after the end of the first fragment; and aggregate the modified second fragment with other modified fragments to yield a codeword. The data recovery circuit is operable to process the codeword to yield an original data set.

In some instances of the aforementioned embodiments, the data set includes a postamble including the first M-bits of the second fragment at the end of the first fragment, and the data set includes identification information between the postamble and the second fragment. In some cases, the identification information includes a preamble pattern and synchronization data. In various instances of the aforementioned embodiments, the value of M is programmable. In one or more instances of the aforementioned embodiments, the data processing system may be implemented as, but is not limited to, a storage device, or a communication device. In some instances of the aforementioned embodiments, the data processing system is implemented as part of an integrated circuit. In various instances of the aforementioned embodiments, the data recovery circuit includes: a data detector circuit operable to apply a data detection algorithm to the codeword to yield a detected output; and a data decoder circuit operable to apply a data decoding algorithm to a decoder input to yield a decoded output, where the decoder input is derived from the detected output.

Turning to FIG. 1, a storage system 100 is shown that includes a read channel 110 having enhanced fragment stitching circuitry in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head 176 is accurately positioned by motor controller 168 over a desired data track on disk platter 178. Motor controller 168 both positions read/write head 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head 176 is positioned adjacent the proper data track, magnetic signals representing data on disk platter 178 are sensed by read/write head 176 as disk platter 178 is rotated by spindle motor 172. The sensed magnetic signals are provided as a continuous, minute analog signal representative of the magnetic data on disk platter 178. This minute analog signal is transferred from read/write head 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In operation, data written to disk platter 178 is split into fragments or portions, and the fragments are augmented with synchronization information to yield a modified fragment. In addition, data from the beginning of the next fragment is appended to the end of the modified fragment as part of a postamble. Multiple modified fragments covering all of the fragments into which the data was originally split are concatenated and transferred via to disk platter 178. The transferred data is then read back from disk platter 178, disaggregated, and the individual fragments re-assembled to yield a defragmented data set. This defragmenting includes adding data from the postamble to individual fragments in a stitching operation that reduces the effects of discontinuity between fragments on the backend processing. The fragmenting and de-fragmenting may be done using a circuit similar to that discussed below in relation to FIG. 4 and/or FIG. 6, and/or the processing may be performed similar to the methods described below in relation to FIG. 7 and FIG. 8.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
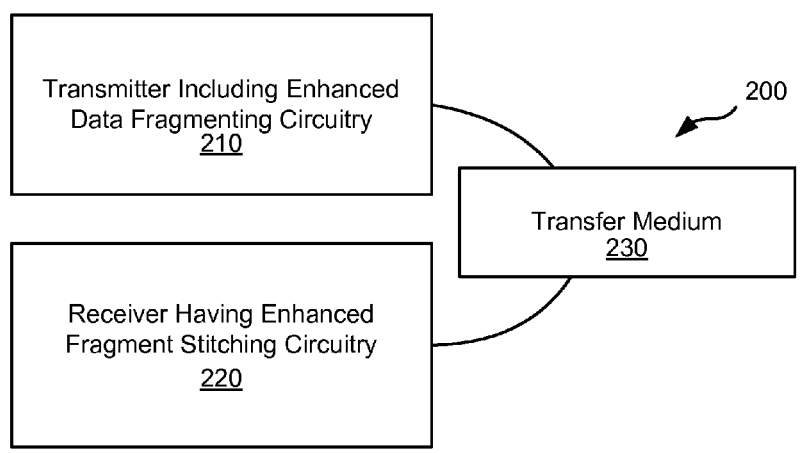
FIG. 2 shows a data transmission device including a receiver having enhanced fragment stitching circuitry in accordance with one or more embodiments of the present invention.

Turning to FIG. 2, a data transmission system 200 including a receiver 220 enhanced fragment stitching circuitry in accordance with one or more embodiments of the present invention. Transmitter 210 including enhanced data fragmenting circuitry that splits data into fragments or portions, and the fragments are augmented with synchronization information to yield a modified fragment. Transmitter 210 transmits the modified fragments via a transfer medium 230 as is known in the art. The encoded data is received from transfer medium 230 by receiver 220.

During operation, data sent via transfer medium 230 is split into fragments or portions by transmitter 210, and the fragments are augmented with synchronization information to yield a modified fragment. In addition, data from the beginning of the next fragment is appended to the end of the modified fragment as part of a postamble. Multiple modified fragments covering all of the fragments into which the data was originally split are concatenated and transferred via transfer medium 230. The transferred data is received by receiver 220 and disaggregated and the individual fragments re-assembled to yield a de-fragmented data set. This defragmenting includes adding data from the postamble to individual fragments in a stitching operation that reduces the effects of discontinuity between fragments on the backend processing. The fragmenting and de-fragmenting may be done using a circuit similar to that discussed below in relation to FIG. 4 and/or FIG. 6, and/or the processing may be performed similar to the methods described below in relation to FIG. 7 and FIG. 8.

Figure 3:
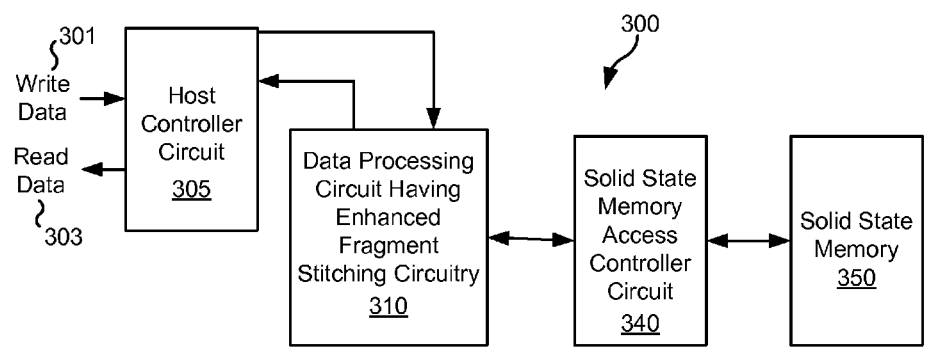
FIG. 3 shows a solid state memory circuit including a data processing circuit having enhanced fragment stitching circuitry in accordance with some embodiments of the present invention.

Turning to FIG. 3, another storage system 300 is shown that includes a data processing circuit 310 having enhanced slice stitching circuitry in accordance with one or more embodiments of the present invention. A host controller circuit 305 receives data to be stored (i.e., write data 301). This data is segregated into fragments or portions by data processing circuit 310 prior to being transferred to a solid state memory access controller circuit 340. The fragments are augmented with synchronization information to yield a modified fragment. In addition, data from the beginning of the next fragment is appended to the end of the modified fragment as part of a postamble. Multiple modified fragments covering all of the fragments into which the data was originally split are concatenated and transferred to the solid state memory access controller circuit 340. The transferred data may then be read from the solid state memory access controller 340, disaggregated, and the individual fragments re-assembled to yield a de-fragmented data set. This defragmenting includes adding data from the postamble to individual fragments in a stitching operation that reduces the effects of discontinuity between fragments on the backend processing. The fragmenting and de-fragmenting may be done using a circuit similar to that discussed below in relation to FIG. 4 and/or FIG. 6, and/or the processing may be performed similar to the methods described below in relation to FIG. 7 and FIG. 8.

Figure 4:
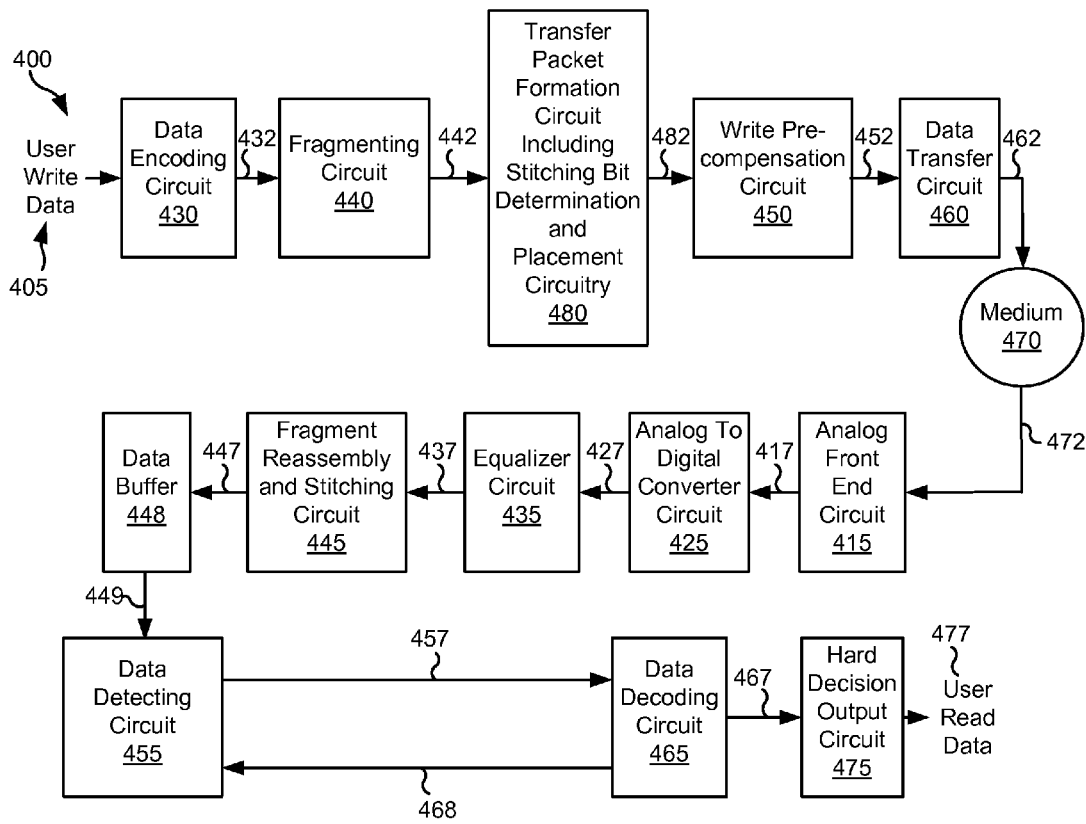
FIG. 4 shows a data transfer circuit including a fragment reassembly and stitching circuit in accordance with various embodiments of the present invention.

Turning to FIG. 4, a data transfer circuit 400 is shown that includes a fragment reassembly and stitching circuit 445 in accordance with one or more embodiments of the present invention. Data transfer circuit 400 includes a data encoding circuit 430 that is operable to apply a data encoding algorithm to user write data 405 to yield an encoded output 432. In some embodiments of the present invention, data encoding circuit 430 applies a low density parity check encoding algorithm as is known in the art. Based upon the disclosure provided herein, one of ordinary skill in the art will recognize a variety of encoding algorithms and/or combinations of encoding algorithms that may be implemented in accordance with different embodiments of the present invention.

Turning to FIG. 5a, an encoded user data set 500 is shown as an example of encoded output 432. Retuning to FIG. 4, encoded output 432 is provided to a fragmenting circuit 440 that segregates encoded output 432 into a number of fragments or portions that are provided as a portion output 442 to a transfer packet formation circuit 480. Transfer packet formation circuit 480 includes stitching bit determination and placement circuitry. Turning to FIG. 5b, a fragmented data set 501 is shown that includes a data fragment A 510, a data fragment B 520, data fragment C 530, data fragment D 540, and data fragment E 550. Fragmented data set 501 is an example of portion output 442 of FIG. 4.

Referring again to FIG. 4, transfer packet formation circuit 480 operates to append a preamble and synchronization data to the beginning of each data fragment in portion output 442, and to append a postamble to the end of each data fragment in portion 442. The preamble may be a periodic pattern useful for frequency and phase adjustment of a sampling circuit as is known in the art. In one particular embodiment of the present invention, the periodic pattern is a "2T pattern" (i.e., '110011001100 . . . '). The synchronization data may be a defined sync code used to indicate the beginning of an associated fragment. Turning to FIG. 5c, a modified fragment set 502 including: fragment A 510 modified to be preceded by a preamble 506 and synchronization data 507, and to be followed by a postamble 512; fragment B 520 modified to be preceded by a preamble 516 and synchronization data 517, and to be followed by a postamble 522; and fragment C 530 modified to be preceded by a preamble 526 and synchronization data 527, and to be followed by a postamble (not shown). Referring again to FIG. 4, transfer packet formation circuit 480 additionally takes M+N bits of data from the beginning of the next data fragment and uses them to replace the first M+N bits of the postamble following the current data fragment to yield a modified postamble. In some embodiments of the present invention, the value of M is programmable, while in other embodiments the value is fixed. Similarly, in some embodiments of the present invention, the value of N is programmable, while in other embodiments the value is fixed. In one particular embodiment of the present invention the value is M is three (3) and the value of N is three (3). Based upon the disclosure provided herein, one of ordinary skill in the art will recognize a variety of values that may be used for M and N in accordance with different embodiments of the present invention. The combination of adding preamble, synchronization and modified postamble data to a data fragment results in a transfer fragment. This process is repeated for a number of data fragments corresponding to encoded output 432. Each of the resulting transferred fragments are concatenated one to another to yield an aggregate output 482. Turning to FIG. 5d, an aggregate output 503 is depicted that includes a number of transfer fragments (560, 570) that each include a preamble, synchronization data, a data fragment, and a modified postamble. In particular, transfer fragment 560 includes preamble 506, synchronization data 507, data fragment A 510, and a modified postamble 582; and transfer fragment 570 includes preamble 516, synchronization data 517, data fragment B 520, and a modified postamble 592. Modified postamble 582 includes the first M bits 513 from data fragment B 520 and the first N bits 514 from data fragment B 520 replacing the first M+N bits of postamble 512. Similarly, modified postamble 592 includes the first M bits 523 from data fragment C 530 and the first N bits 524 from data fragment C 530 replacing the first M+N bits of postamble 522. Aggregate output 503 is an example of a portion of aggregate output 482.

Referring again to FIG. 4, aggregate output 482 is provided to a write pre-compensation circuit 450. Write pre-compensation circuit 450 generates a compensated output 452 that is provided to a data transfer circuit 460. Data transfer circuit 460 may be any circuit capable of providing the received information to a transfer medium 470 as a data output 462. As such, data transfer circuit 460 may be, but is not limited to, a solid state storage device write circuit, a magnetic storage device write circuit, or a data transmission circuit.

Data output 462 is received by an analog front end circuit 415 from medium 470 as a read input 472. Analog front end circuit 415 processes read input 472 to yield a processed analog signal 417 that is provided to an analog to digital converter circuit 425. Analog front end circuit 415 may include, but is not limited to, an analog filter and an amplifier circuit as are known in the art. Based upon the disclosure provided herein, one of ordinary skill in the art will recognize a variety of circuitry that may be included as part of analog front end circuit 415. Analog to digital converter circuit 425 converts processed analog signal 417 into a corresponding series of digital samples 427. Analog to digital converter circuit 425 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 427 are provided to an equalizer circuit 435. Equalizer circuit 435 applies an equalization algorithm to digital samples 427 to yield an equalized output 437. In some embodiments of the present invention, equalizer circuit 435 is a digital finite impulse response filter circuit as are known in the art.

Figure 5E:
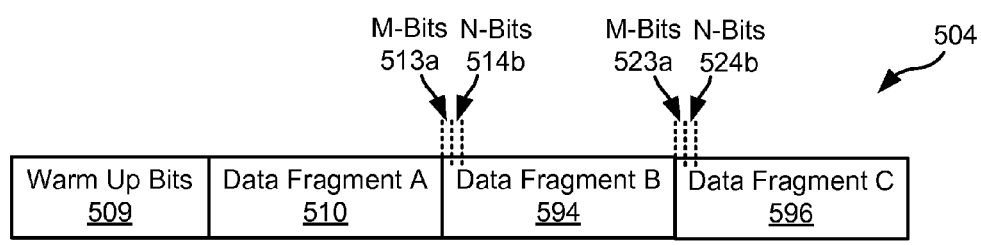

Equalized output 437 is provided to fragment reassembly and stitching circuit 445. Fragment reassembly and stitching circuit 445 is operable to separate the data fragments from the preamble, synchronization and postamble data. Then replaces the first M-bits of each data fragment with the first M-bits of the preceding postamble. As the first M+N bits of the preceding postamble are the first M+N bits of the data fragment prior to transfer, this results in substantially the same M+N bits at the beginning of each data fragment, and provides a continuous transition between the last bits of the preceding data fragment and the first M-bits of the current data fragment, and a reasonably continuous transition between the first M-bits of the current data fragment and the next N-bits of the current data fragment. In addition, fragment reassembly and stitching circuit 445 adds warm up bits prior to the first data fragment to allow for adjustment to the transition to the first part of the data fragment. In some cases, these warm up bits are the first bit of the first fragment replicated a number of times. The result is a stitched codeword similar to encoded output 432 plus any noise introduced during processing and transfer via medium 470. Turning to FIG. 5e, a stitched codeword 504 is shown that includes warm up bits 509, data fragment A 510, a modified data fragment B 594, and a modified data fragment C 596. Modified data fragment B 594 includes the first M-bits 513a of modified postamble 582 as they exist after processing and transfer replacing the first M-bits of data fragment B 520 followed by the next N-bits 514b of data fragment B 520 as they exist after processing and transfer. Similarly, modified data fragment C 596 includes the first M-bits 523a of modified postamble 592 as they exist after processing and transfer replacing the first M-bits of data fragment C 530 followed by the next N-bits 524b of data fragment C 530 as they exist after processing and transfer. Stitched codeword 504 is an example of a portion of stitched codeword 447.

Figure 6:
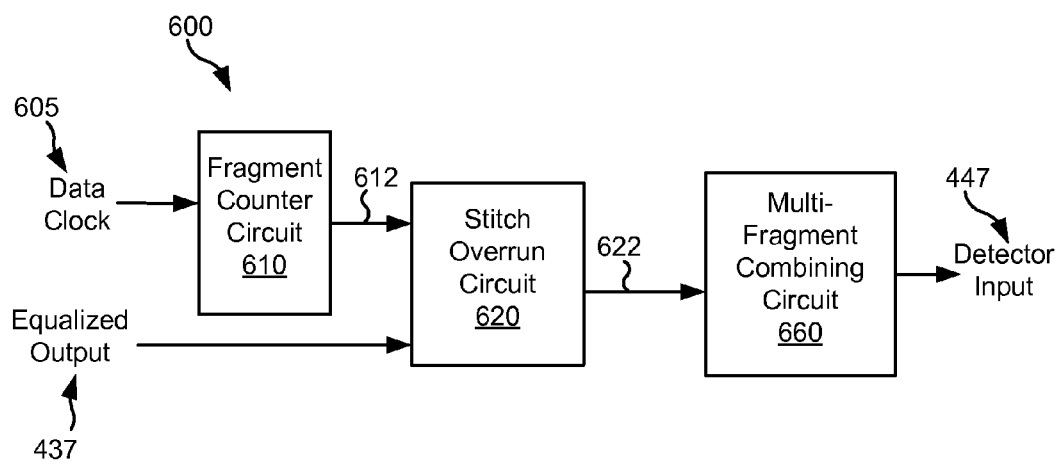
FIG. 6 shows a detailed block diagram of a data reassembly and stitching circuit in accordance with one or more embodiments of the present invention.

FIG. 6, is a block diagram of a data reassembly and stitching circuit 600 in accordance with one or more embodiments of the present invention. Data reassembly and stitching circuit 600 may be used in place of fragment reassembly and stitching circuit 445. Data reassembly and stitching circuit 600 includes a fragment counter circuit 610 that is incremented as each instance of equalized output 437 is received. The resulting count value 612 indicates the beginning and end of fragments in equalized output 437. Once the end of a fragment is indicated by count value 612, fragment counter circuit 610 is reset to indicate the beginning of the next fragment.

Count value 612 is provided to a stitch overrun circuit 620 that includes M-bits from the postamble of the preceding fragment to be maintained as the first M-bits of the next data fragment indicated by count value 612. A resulting stitched codeword 622 (including the first M-bits of the preceding postamble replacing the first M-bits of the next data fragment) is provided to a multi-fragment combining circuit 660. Multi-fragment combining circuit 660 combines multiple fragments together to yield stitched codeword 447.

Stitched codeword 447 is stored to a data buffer 448 where it awaits backend processing through a data detecting circuit 455 and a data decoding circuit 465. In particular, a detector input 449 from data buffer 448 is provided to data detecting circuit 455. Data detecting circuit 455 may be any circuit known in the art that is capable of apply a data detection algorithm to a data set to yield a detected output. As some examples, data detecting circuit 455 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detecting circuits that may be used in relation to different embodiments of the present invention. Detected output 457 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 457 is provided to data decoding circuit 465 that applies a data decoding algorithm to the received input to yield a decoded output 467. In one particular embodiment of the present invention, data decoding circuit 465 is operable to apply a low density parity check decoded circuit. Where decoded output 467 fails to converge (i.e., fails to reflect the original data), it is provided as a feedback 468 to data detecting circuit 455 to apply another iteration of the combination of data detecting circuit 455 and data decoding circuit 465. Alternatively, where decoded output 467 does converge (i.e., reflects the original data), it is provided to a hard decision output circuit 475 that provides the resulting hard decisions as user read data 477.

Figure 7:
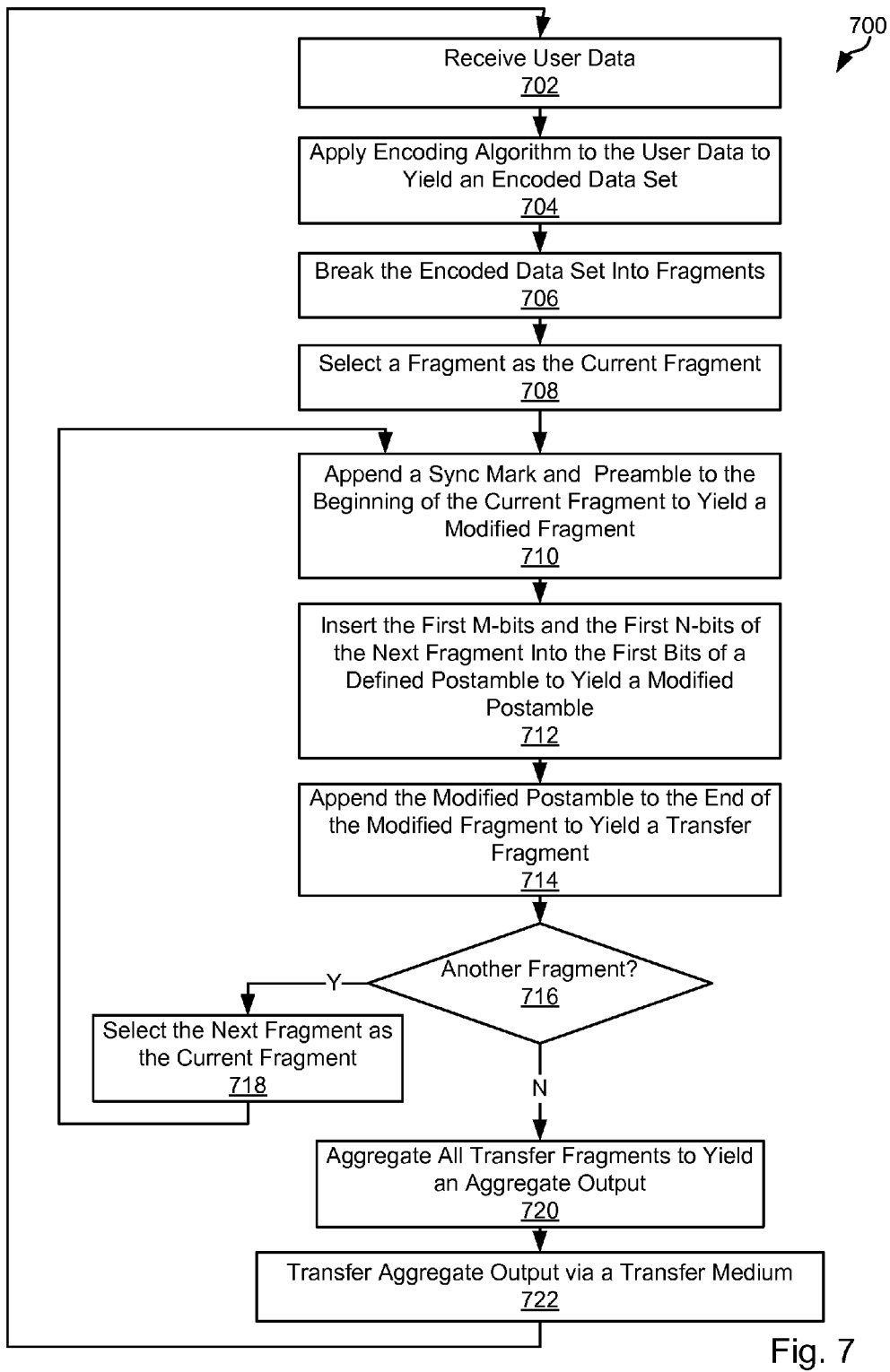
FIG. 7 is a flow diagram showing a method in accordance with some embodiments of the present invention for fragmenting a data set in preparation for transfer via a transfer medium.

Turning to FIG. 7, a flow diagram 700 shows a method in accordance with some embodiments of the present invention for fragmenting a data set in preparation for transfer via a transfer medium. Following flow diagram 700, a user data set is received (block 702). An encoding algorithm is applied to the received user data to yield an encoded data set (block 704). In one particular embodiment of the present invention, the encoding algorithm is a low density parity check encoding algorithm as is known in the art. Based upon the disclosure provided herein, one of ordinary skill in the art will recognize other encoding algorithms that may be used in relation to different embodiments of the present invention. The encoded data set is broken into fragments (block 706). The size of the fragments may be predefined. FIG. 5b shows a fragmented data set 501 as an example of the result of block 706. As shown, fragmented data set 501 includes a data fragment A 510, a data fragment B 520, data fragment C 530, data fragment D 540, and data fragment E 550.

A first fragment from the fragmented data set is selected as a current fragment (block 708). A synchronization mark and a preamble are appended to the beginning of the current fragment to yield a modified fragment (block 710). In addition, the first M+N bits of the next fragment are used to replace the first M+N bits of a defined postamble to yield a modified postamble (block 712). The modified postamble is then appended to the end of the modified fragment to yield a transfer fragment (block 714). FIG. 5d shows an example of such a transfer fragment as transfer fragment 560 that includes preamble 506, synchronization data 507, data fragment A 510, and a modified postamble 582.

It is then determined whether another fragment remains to be converted to a transfer fragment (block 716). Where another fragment remains to be converted (block 716), the next fragment is selected as the current fragment (block 718). Then, the processes of blocks 710-718 are repeated for the next fragment. Alternatively, where no additional fragments remain to be converted (block 716), all of the recently prepared transfer fragments are aggregated to yield an aggregate output (block 720). FIG. 5d shows an example of such an aggregate output as aggregate output 503 that includes a number of transfer fragments (560, 570) that each include a preamble, synchronization data, a data fragment, and a modified postamble. In particular, transfer fragment 560 includes preamble 506, synchronization data 507, data fragment A 510, and modified postamble 582; and transfer fragment 570 includes preamble 516, synchronization data 517, data fragment B 520, and modified postamble 592. Modified postamble 582 includes the first M bits 513 from data fragment B 520 and the first N bits 514 from data fragment B 520 replacing the first M+N bits of postamble 512. Similarly, modified postamble 592 includes the first M bits 523 from data fragment C 530 and the first N bits 524 from data fragment C 530 replacing the first M+N bits of postamble 522. Aggregate output 503 is an example of a portion of aggregate output 482. The value of one or both of M and N may be programmable or fixed. In one particular embodiment of the present invention the value is M is three (3) and the value of N is three (3). Based upon the disclosure provided herein, one of ordinary skill in the art will recognize a variety of values that may be used for M and N in accordance with different embodiments of the present invention.

The aggregated output may be transferred via a medium (block 722). The medium may be, but is not limited to, a storage medium, a wireless communication medium, or a wired communication medium. Such a storage medium may be, but is not limited to, an optical storage medium, a magnetic storage medium, or a solid state storage medium. Based upon the disclosure provided herein, one of ordinary skill in the art will recognize different mediums that may be used in relation to different embodiments of the present invention.

Figure 8:
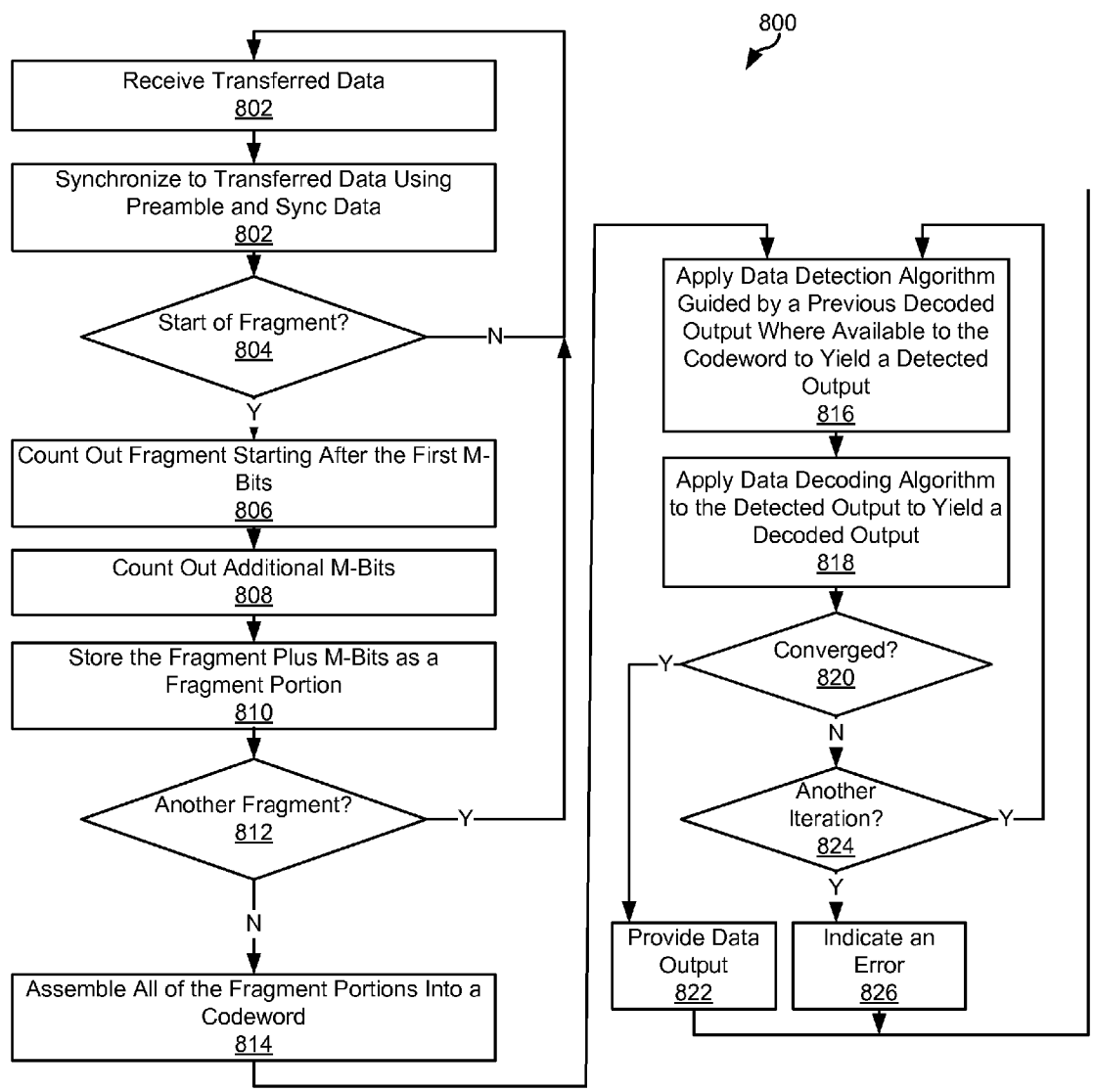
FIG. 8 is a flow diagram showing a method in accordance with some embodiments of the present invention for re-assembling a previously fragmented data set for backend processing.

Turning to FIG. 8, a flow diagram 800 shows a method in accordance with some embodiments of the present invention for re-assembling a previously fragmented data set for back-end processing. Following flow diagram 800, transferred data is received (block 802). FIG. 5d shows an example of such transferred data as aggregate output 503 that includes a number of transfer fragments (560, 570) that each include a preamble, synchronization data, a data fragment, and a modified postamble. In particular, transfer fragment 560 includes preamble 506, synchronization data 507, data fragment A 510, and modified postamble 582; and transfer fragment 570 includes preamble 516, synchronization data 517, data fragment B 520, and modified postamble 592. Modified postamble 582 includes the first M bits 513 from data fragment B 520 and the first N bits 514 from data fragment B 520 replacing the first M+N bits of postamble 512. Similarly, modified postamble 592 includes the first M bits 523 from data fragment C 530 and the first N bits 524 from data fragment C 530 replacing the first M+N bits of postamble 522. Aggregate output 503 is an example of a portion of aggregate output 482. The value of one or both of M and N may be programmable or fixed. In one particular embodiment of the present invention the value is M is three (3) and the value of N is three (3). Based upon the disclosure provided herein, one of ordinary skill in the art will recognize a variety of values that may be used for M and N in accordance with different embodiments of the present invention.

The preamble and synchronization data is used to synchronize to the received data (block 802). Based upon the finding of a preamble followed by the synchronization data the beginning of a fragment can be determined. It is determined whether the start of a fragment is indicated (block 804). Where the start of a fragment is indicated (block 804), the instances of the fragment are counted after the first M-bits (block 806) plus an additional M-bits (block 808), and the fragment plus M-bits is stored as a fragment portion (block 810). Doing such results in the first M-bits of the postamble being included as the first M-bits of the next fragment.

It is determined whether another fragment remains to be processed (block 812). Where another fragment remains to be processed (block 812), the processes beginning at block 802 are performed to process the next segment. Alternatively, where no additional fragments remain to be processed (block 812), all of the fragment portions are assembled into a codeword (block 814). An example of a portion of such a codeword is shown in FIG. 5e as stitched codeword 504. As shown, stitched codeword 504 includes warm up bits 509, data fragment A 510, a modified data fragment B 594, and a modified data fragment C 596. Modified data fragment B 594 includes the first M-bits 513a of modified postamble 582 as they exist after processing and transfer replacing the first M-bits of data fragment B 520 followed by the next N-bits 514b of data fragment B 520 as they exist after processing and transfer. Similarly, modified data fragment C 596 includes the first M-bits 523a of modified postamble 592 as they exist after processing and transfer replacing the first M-bits of data fragment C 530 followed by the next N-bits 524b of data fragment C 530 as they exist after processing and transfer.

A data detection algorithm is applied to the codeword to yield a detected output (block 816). Where available, application of the data detection algorithm is guided by a previous decoded output. The data detection algorithm may be any data detection algorithm known in the art including, but not limited to, a Viterbi data detection algorithm or a maximum a posteriori data detection algorithm. Based upon the disclosure provided herein, one of ordinary skill in the art will recognize a variety of data detection algorithms that may be used in relation to different embodiments of the present invention.

A data decoding algorithm is applied to the detected output to yield a decoded output (block 818). The data decoding algorithm may be, for example, a low density parity check decoding algorithm as are known in the art. Based upon the disclosure provided herein, one of ordinary skill in the art will recognize a variety of data decoding algorithms that may be used in relation to different embodiments of the present invention. It is determined whether application of the data decoding algorithm converged (block 820). Where the algorithm converged (no errors remain) (block 820), the decoded output is provided as a data output (block 822). Otherwise, where the algorithm failed to converge (errors remain) (block 820), it is determined whether another iteration applying the data detection algorithm and the data decoding algorithm is desired (block 824). Where another iteration is desired (block 824), the processes of blocks 816-822 are repeated. Alternatively, where no additional iterations are desired (block 824), an error is indicated (block 826).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A hard disk drive, the hard disk drive comprising:
   a disk platter;
   a data write circuit including:
      a fragmenting circuit operable to separate a data set into at least a first fragment and a second fragment;
      a transfer packet formation circuit operable to:
         append identification information to the front of the first fragment, and at least a first M+N bits of the second fragment to the end of the first fragment to yield a first transfer fragment; and
         aggregate the first transfer fragment with other transfer fragments to yield an aggregate output; and
      a data transfer circuit operable to store the aggregate output to the disk platter as a stored information;
   a head assembly disposed in relation to the disk platter and operable to:
      sense the stored information on the disk platter to yield a sensed information;

provide a signal corresponding to the sensed information;
a data reading circuit including:
an analog to digital converter circuit operable to convert the sensed information to a series of digital samples;
an equalizer circuit operable to equalize the series of digital samples to yield an equalized output, wherein the equalized output includes the first fragment of data and the second fragment of data;
a stitching circuit operable to:
receive the stored information including at least a first fragment and a second fragment, wherein the first M-bits of the second fragment are received both as the first M-bits after the end of the first fragment and as the first M-bits of the second fragment;
generate a modified second fragment based on the second fragment from the stored information, wherein a first M-bits of the second fragment are derived from a first M-bits after the end of the first fragment;
aggregate the modified second fragment with other modified fragments to yield a codeword; and
a data recovery circuit operable to process the codeword to yield an original data set.

2. The hard disk drive of claim 1, wherein the data recovery circuit comprises:
a data detector circuit operable to apply a data detection algorithm to the codeword to yield a detected output; and
a data decoder circuit operable to apply a data decoding algorithm to a decoder input to yield a decoded output, wherein the decoder input is derived from the detected output.

3. The hard disk drive of claim 1, wherein at least one of the value of M and the value of N is programmable.

4. The hard disk drive of claim 1, wherein the identification information includes a preamble pattern and synchronization data.

5. The hard disk drive of claim 1, wherein the system further comprises: a data encoding circuit operable to apply a data encoding algorithm to an input to yield the data set.

6. The hard disk drive of claim 5, wherein the data encoding algorithm is a low density parity check algorithm.

7. A data storage device, the system comprising:
a disk platter;
a data reading circuit including:
an analog to digital converter circuit operable to convert sensed information derived from the disk platter to a series of digital samples;
an equalizer circuit operable to equalize the series of digital samples to yield an equalized output, wherein the equalized output includes a data set including at least a first fragment and second fragment;
a stitching circuit operable to:
receive the data set, wherein a first M-bits of the second fragment are received both as the first M-bits after the end of the first fragment and as the first M-bits of the second fragment;
generate a modified second fragment based on the second fragment from the data set, wherein the first M-bits of the second fragment are derived from the first M-bits after the end of the first fragment;
aggregate the modified second fragment with other modified fragments to yield a codeword; and
a data recovery circuit operable to process the codeword to yield an original data set.

8. The data storage device of claim 7, wherein the data set includes a postamble including the first M-bits of the second fragment at the end of the first fragment, and wherein the data set includes identification information between the postamble and the second fragment.

9. The data storage device of claim 8, wherein the identification information includes a preamble pattern and synchronization data.

10. The data storage device of claim 7, wherein the value of M is programmable.

11. The data storage device processing system of claim 7, wherein the data recovery circuit comprises:
a data detector circuit operable to apply a data detection algorithm to the codeword to yield a detected output; and
a data decoder circuit operable to apply a data decoding algorithm to a decoder input to yield a decoded output, wherein the decoder input is derived from the detected output.

12. The data storage device of claim 11, wherein the data detection algorithm is selected from a group consisting of: a maximum a posteriori data detection algorithm, and a Viterbi data detection algorithm.

13. The data storage device of claim 11, wherein the data decoding algorithm is a low density parity check algorithm.

14. A storage device, the system comprising:
a disk platter;
a data write circuit including:
a fragmenting circuit operable to separate a data set into at least a first fragment and a second fragment;
a transfer packet formation circuit operable to:
append identification information to the front of the first fragment, and at least a first M+N bits of the second fragment to the end of the first fragment to yield a first transfer fragment; and
aggregate the first transfer fragment with other transfer fragments to yield an aggregate output; and
a data transfer circuit operable to store the aggregate output to the disk platter as a stored information.

15. The storage device of claim 14, wherein at least one of the value of M and the value of N is programmable.

16. The storage device of claim 14, wherein the system further comprises:
a data encoding circuit operable to apply a data encoding algorithm to an input to yield the data set.

17. The storage device of claim 14, wherein the data encoding algorithm is a low density parity check algorithm.

* * * * *